United States Patent [19] Ferch

[11] 4,253,415

[45] Mar. 3, 1981

[54] PORTABLE ILLUMINATED TRAFFIC LIGHT

[75] Inventor: Alois Ferch, Neuss, Fed. Rep. of Germany

[73] Assignee: Ferch & Nabben, Fed. Rep. of Germany

[21] Appl. No.: 45,249

[22] Filed: Jun. 4, 1979

[51] Int. Cl.³ ............................ G01F 9/01; G01F 9/04

[52] U.S. Cl. .................................... 116/63 P; 40/549; 40/612; 340/114 R

[58] Field of Search ................ 116/63 P; 40/549, 575, 40/608, 606, 607, 612; 340/114 R, 116

[56] References Cited

U.S. PATENT DOCUMENTS

| | | | |
|---|---|---|---|
| 2,558,944 | 7/1951 | Emmerson | 40/575 X |
| 3,016,035 | 1/1962 | Asbury | 40/612 X |
| 3,136,083 | 6/1964 | Guth, Jr. | 40/549 X |
| 3,380,428 | 4/1968 | Abrams | 404/10 X |
| 3,485,201 | 12/1969 | Kelly | 40/612 X |
| 3,593,447 | 7/1971 | Winegarten | 40/549 X |
| 3,792,679 | 2/1974 | Duckett et al. | 40/608 X |
| 3,838,661 | 10/1974 | Medley, Jr. | 40/608 X |
| 3,863,372 | 2/1975 | Stilling | 40/549 X |
| 3,913,518 | 10/1975 | Kaplan | 40/612 X |
| 3,972,107 | 8/1976 | Deike | 40/612 X |
| 4,032,248 | 6/1977 | Parduhn | 40/608 X |
| 4,061,435 | 12/1977 | Schmanski et al. | 40/608 |
| 4,117,455 | 9/1978 | Cervantes | 116/63 P X |

*Primary Examiner*—Daniel M. Yasich
*Attorney, Agent, or Firm*—Mandeville and Schweitzer

[57] ABSTRACT

Roadway traffic and/or warning signs are provided with the construction thereof being such so as to provide flexible and/or pliable structures which are simultaneously lightweight for easy handling, but are of substantial strength. The signs of the invention are, preferably, comprised of molded polyurethane foam of integral structure which will give upon impact without damage, and will revert to their previous position once the forces causing the impact are removed.

13 Claims, 14 Drawing Figures

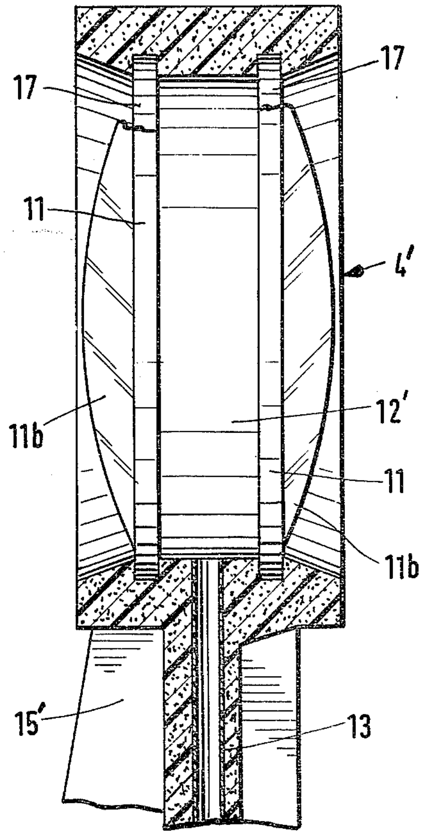
Fig. 8
Fig.9
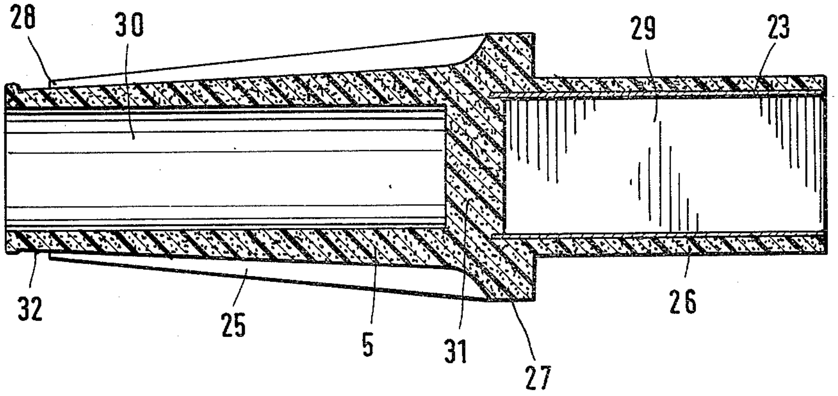

PORTABLE ILLUMINATED TRAFFIC LIGHT

BACKGROUND AND DESCRIPTION OF THE INVENTION

Traffic signs in current use which provide advance warning of danger spots have a weighted foot or pedestal made of either U-sections arranged at 90° or a flat-topped concrete cone. This foot is connected to a tube to which a flat sheet-metal sign is secured by means of poppet bushes. A hazard warning light is attached to the top of the tube. The lights in a row of warning signs are generally connected in series. The feet or pedestals of traffic signs are normally designed so that the sign is attached to one end of the tube or rod and the other end is inserted into a hole located centrally in the foot.

There are also less frequent designs where the foot and tube are permanently connected together. These types normally have concrete bases. In addition, traffic signs are also known where the tube is fixed to the foot in such a way that the sign will tilt on collision. Practice has shown that traffic signs in current use have considerable safety defects due to the rigid connection between the relatively solid metal sign and the weighted foot.

When road conditions are poor, such as in fog, frequent serious traffic accidents occur caused by vehicles colliding with the traffic signs. In collisions involving two-wheelers, the accident is often fatal. However, even with designs where the connection between the tube carrying the sign and the foot is articulated to allow the sign to tilt on collision, there is the danger that adverse conditions prevailing along the road can reduce the capability of the sign to tilt due to, for example, stones or concrete or similar small objects getting into the articulation joint, which thus does not reduce the risk of accident. The danger is, in particular, increased when, for example, signs of this type are unintentionally turned so that they are parallel to the direction of travel.

Another disadvantage of known traffic signs is that the hazard warning lights are fragile and easily breakable which results in frequent failure. Thus, there is difficulty in recognizing the signs in darkness, fog or rain. A frequent occurrence is that damage to only one light results in failure of the entire row of traffic signs, the lights of which are connected in series on one circuit.

The object of the invention is to provide a traffic sign of the type discussed above which does not incorporate the disadvantages listed, but rather which is designed so as to reduce the risk of injury in the event of collision by providing a light-weight, pliable construction which will render handling easier for road workers and which will give increased protection to hazard warning lights attached. In addition, it should be made possible to use the basic parts of the current rigid traffic signs by rendering them pliable, in accordance with the invention. This object, in accordance with the invention, is embodied in the characteristics presented in claim 1.

The flexible design of the traffic sign will considerably reduce the danger of collisions near roadworks. Polyurethane foam is a particularly suitable material of low specific gravity for manufacturing the signs, since it possesses adequate pliability, but is, at the same time, of high strength so that the sign has sufficient stability to withstand arduous conditions. In addition to adequate pliability after it has passed its bending force, the molecular structure of polyurethane foam allows the formed part to return to its original shape without undesired deformations after cessation of the bending forces.

The formed parts are easy to manufacture and are characterized by their very light weight. Excessive bending, such as in strong winds, which could cause the sign to sway undesirably, is avoided by reinforcing ribs and a molded plastic tube for electricity lines running along the length of the sign. The modified design of the traffic sign has several advantages, in that two tube parts connected by an elastic adapter attach the sign to the base. This provides above all, greater pliability of the entire traffic sign and, therefore, means a further minimization of accident risk. In addition, it is possible to adapt current traffic signs to use the feet or pedestals. The foot with a tube inserted is sawed off, and the tube end remaining inserted into the blind bore provided in the adapter of the invention. Finally, the adapters can be used with various cross sections to connect tubes of different diameters and cross sectional shapes.

Since the hazard warning light is embedded on all sides in the material of the sign, with the exception of the protecting glass recessed into the contour of the sign, the risk of damage to the light is practically eliminated. This also will increase traffic safety.

The sign plate of the invention, flat and even on both sides, has an edge reinforcement projecting along the lateral edges. This facilitates the manufacture of the sign to a great extent; the sign is less cumbersome and, therefore, easier to handle. The strips retaining the foil bearing the warning symbols are molded onto the inside of the edge reinforcement, parallel to the longitudinal axis of the traffic sign, such that there is a narrow groove between the face of the sign and each strip.

According to another characteristic of the invention, there are bore holes along the center of the length of the edge reinforcement to receive reinforcing tubes or rods parallel to the longitudinal axis of the traffic sign. It has proved to be an advantage if the reinforcing tubes or rods project below the bottom end of the sign, and thus serve simultaneously as connecting tubes between the sign and the foot. These reinforcing tubes or rods are also made of a pliable plastic material. If metal tubes are used as reinforcing tubes or rods, in accordance with a further characteristic of the invention, there would be breaking points provided along the uncovered parts of the reinforcing tubes or rods projecting below the sign, between the sign and the foot.

In order to replace or, if required, remove the hazard warning light as a unit, it may be designed so that it can be inserted into the sign. To this purpose, the bottom ends of the light have short projecting tubes or rods which can be inserted into corresponding bore holes provided in the upper edge of the sign. The inner diameter of the bore holes are such that they correspond to the outer diameter of the tubes or rods to be inserted. In accordance with a further characteristic of the invention, the hazard warning light may either be connected to an electric line or to a battery by means of bore holes provided in the embedded part of the light to receive tubes carrying the electricity supply cables.

It has also proved to be an advantage that the foot or base, provided in its upper part with bore holes to receive the connecting tubes or rods, is made of a mixture of ground guartz and polyurethane. This reduces the weight of the foot and makes the sign easier to handle. Another significant advantage is that the mixture can be colored with a specific dye, such as a signal color. The quartz-polyurethane mixture ratio is about 1.00:00.15, which is a further advantage. In accordance with a further characteristic of the invention., the foot is provided with handles. The invention will be explained in more detail by means of the enclosed drawings, in which the various designs of the invention are presented.

DESCRIPTION OF THE DRAWINGS

FIG. 8 is an enlarged longitudinal sectional view of a modification of the head section of the traffic sign with hazard warning light visible from front and rear;

FIG. 9 is an enlarged longitudinal sectional view of the adapter portion of FIG. 2;

DETAILED DESCRIPTION OF THE INVENTION

Figure 1:
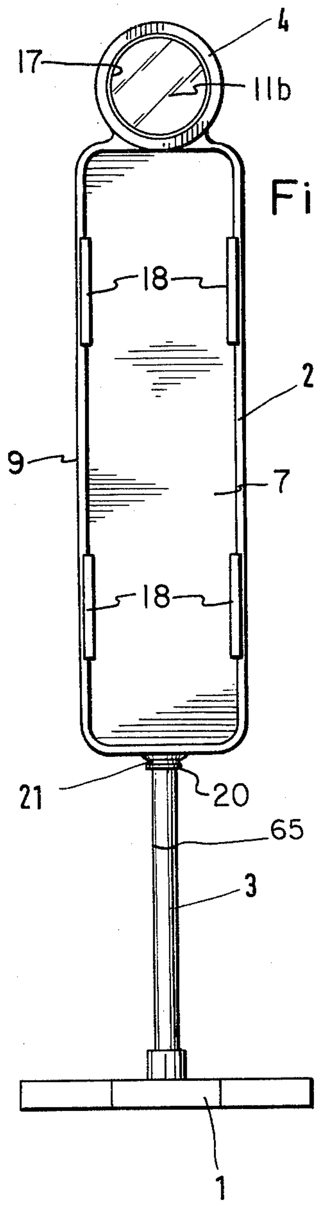
FIG. 1 is a front elevational view of a traffic sign illustrating the invention with a sign, a hazard warning light, an adapter and a foot.

As FIG. 1 shows, the traffic sign basically features a weighted foot 1 made of U-sections welded together and a flat, essentially rectangular lightweight sign 2. In the example depicted, the sign 2 is a formed part made of polyurethane foam. The sign 2 and foot 1 are connected by a tube 3, secured in the center of foot 1. On top, a head section containing the hazard warning light is integrally molded on.

Figure 2:
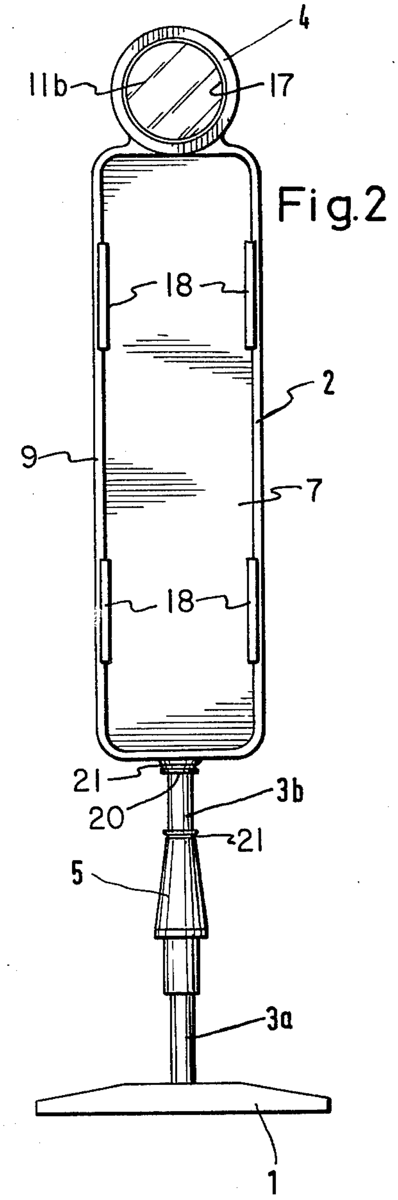
FIG. 2 is a front elevational view of a further embodiment of the traffic sign of the invention, with an adapter.
Figure 3:
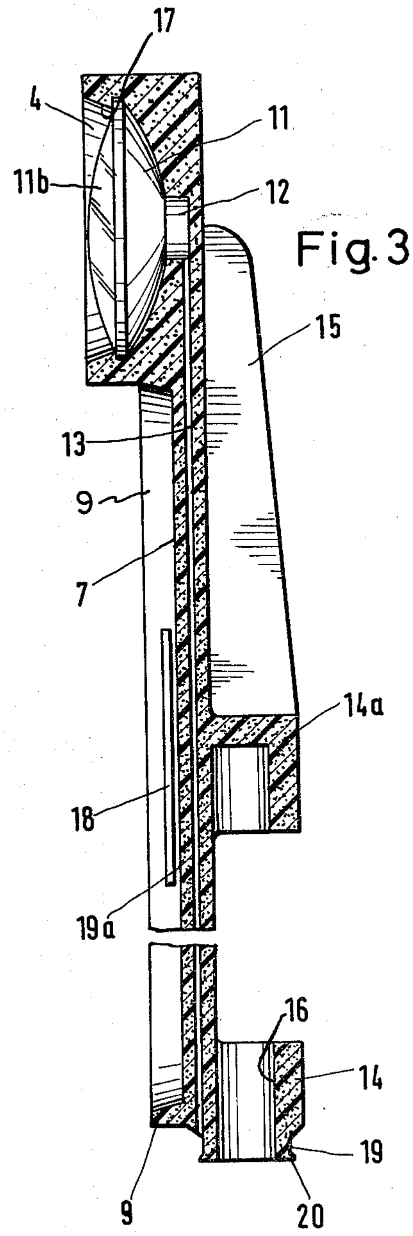
FIG. 3 is an enlarged longitudinal view of a portion of the sign of either FIGS. 1 or 2.

A modified traffic sign is depicted in FIG. 2 of analogous design to the traffic sign in FIG. 1, with the difference that the sign 2 and foot 1 are connected by two coaxial tubes 3*a* and 3*b*, which are themselves connected by means of an elastic adapter 5. Apapter 5 will be described in more detail below. The sign 2, made of polyurethane foam, has a basically rectangular sign plate 7 (FIGS. 3 and 4) onto which the head section 4 is molded. The latter has the shape of a flat cylinder, the axis of which runs perpendicular to the plane of the sign plate 7. As shown in FIG. 3, the head section 4 projects slightly forward in relation to sign plate 7. The head section 4 is hollow to accommodate exactly the shape of the hazard warning light. The hazard warning light 11, comprising reflector, deflector, incandescent lamp and fittings, is embedded on all sides in head section 4, with the exception of protective glass 11*b*, which is itself recessed into the contours of the head section 4. In addition, the head section 4 is provided with a recess 12 to receive the lamp fittings and the cable connections of the lamp 11. This recess 12 has a connection to a bore hole running along the longitudinal axis of the sign 2 for receiving flexible tube 13 into which the electric cables for the lamp 11 are inserted. The protective glass 11*b* is retained by a retaining edge (17) provided in the head section 4.

The plastic tube 13 also has a strengthening function in addition to the reinforcing rib which will be described below. The reinforcement is to prevent the sign 2 from being overly pliable, which would cause undesirable swaying in, for example, high winds.

Figure 5:
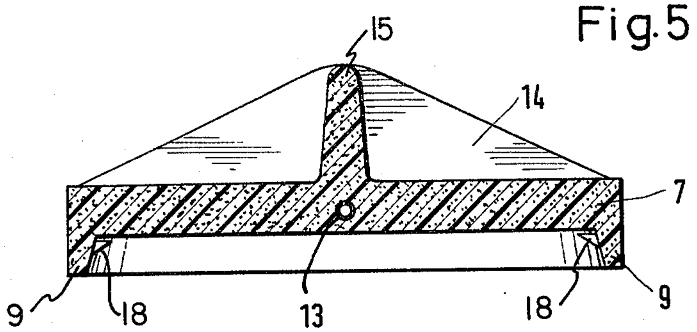
FIG. 5 is a sectional view along lines V—V of FIG. 4.
Figure 6:
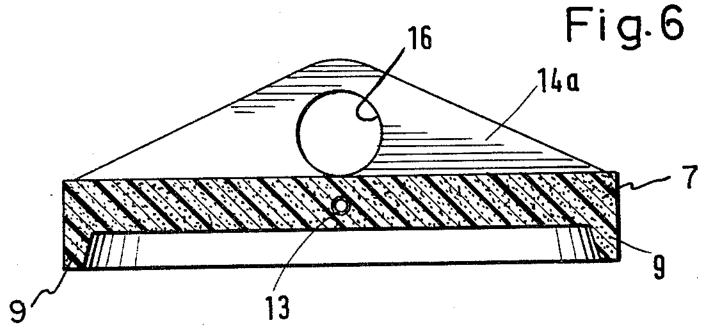
FIG. 6 is a sectional view along lines VI—VI of FIG. 4.

The rear side of head section 4 (FIG. 3) lies along the same plane as the rear of sign plate 7, to which a reinforcement rib 15 is integrally attached along the longitudinal axis of the sign. Also, at the rear side of the sign plate 7 there is an integral cross rib 14*a* connected to the reinforcement rib 15, and extending across the entire width of the sign. Similarly, a second cross rib 14 is integrally attached to the bottom part of sign plate 7. The arrangement of the ribs can be seen in particular in FIGS. 5 and 6. The ribs 14 and 14*a* are pierced by bore hole 16 to receive tube 3, or tube part 3*b*.

For additional stabilization, the sign plate 7 is provided with edge reinforcement 9 (FIG. 3) along the front edge. The retaining edge 17, into which the protective glass 11*b* of the light 11 is inserted, is molded to the front face of head section 4.

At the bottom edge of sign plate 7, connected to the cross rib 14, a hollow cylindrical neck 20 is molded on with an external necking 19 to receive a hose clip 21 (FIG. 1).

Figure 4:
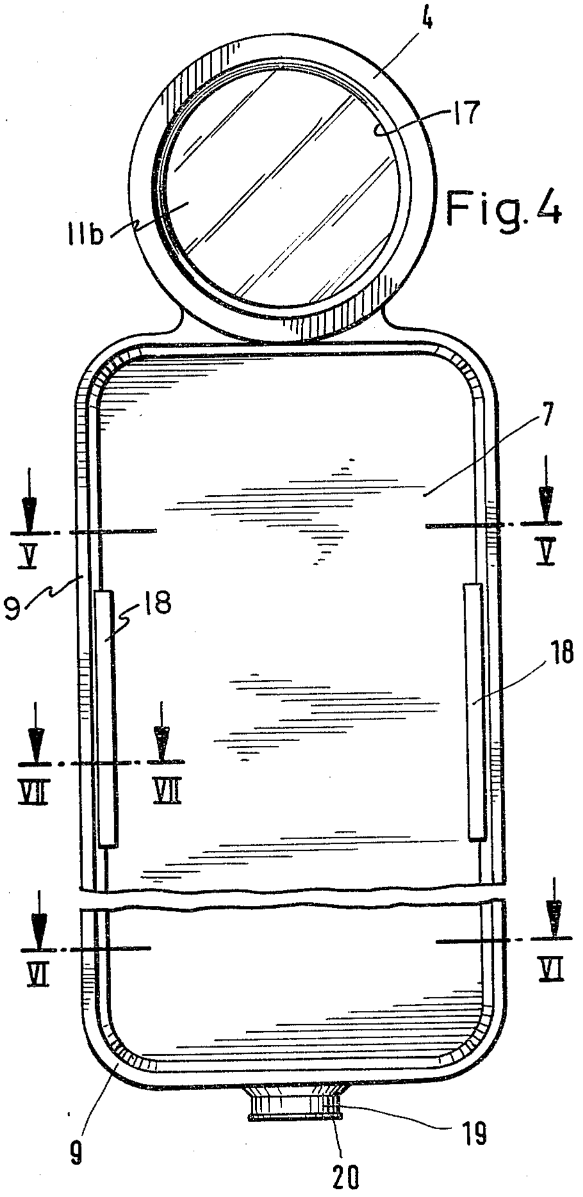
FIG. 4 is a front elevational view of the sign of FIG. 3.
Figure 7:
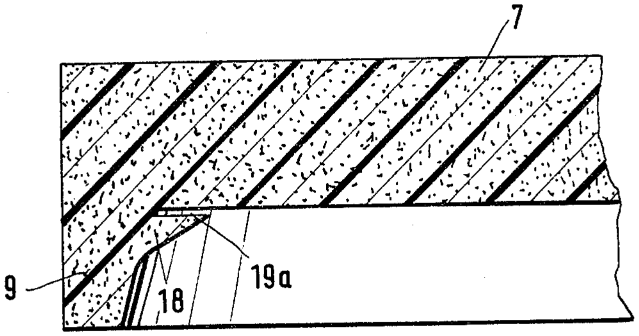
FIG. 7 is a sectional view along line VII—VII of FIG. 4.

FIGS. 4 and 7 show strips 18 molded onto the sides of the edge reinforcement 9 on both the upper and lower sections of the sign 2. Between the sign plate 7 and the strip 18 there is a narrow groove 19*a*. The pliable sheet, displaying the warning symbol with, in this case, red and white stripes, is inserted into the groove 19*a*. The width of the strips 18 are proportioned so that the sheet of aluminum or PVC foil cannot slip out of the groove if the sign 2 is distorted.

FIG. 8 shows a similar design for the sign as in FIGS. 3 and 4. However, the design has a modified head section 4′ for receiving a light visible from both sides. This design is intended for road work being carried out. Inside the head section 4′, a cylindrical cavity 12′ extends through and transversely to the surface of the sign. The two lamps 11 are inserted in this cavity. The protective glass 11*b* is retained by the retaining edges 17 provided in the head section 4′. In the space 12 between lamps 11 are the cable connections for the lamps 11. The flexible plastic tube 13 contains the electricity cables. The reinforcing rib 15′is attached to the lower part of the head section 4′, as distinguished from the design as per FIG. 3.

The coaxial tube parts depicted in FIG. 2 and intended to connect the sign 2 to the foot 1 are connected together by a flexible adapter 5 (FIG. 9). This adapter consists of a molded polyurethane foam piece. Polyurethane is particularly suitable to accomplish the basic function of the adapters due to its structure becuase, if the adapter bends, it returns to its normal shape after cessation of the bending forces without undesirable deformations. Also, polyurethane has the advantage of possessing light weight.

The lower part of adapter 5 (FIG. 9) is prism-shaped. At about the middle of the adapter, there is a collar 27 at the widest part of the adapter's circumference. Above collar 27, the cross section of the adapter gradually diminishes. At both ends of the adapter 5 there are coaxial blind bores 29, 30 extending to about the middle of the adapter for receiving tube parts *3a* and *3b*; blind bore 29 has a square cross section. Between the bottoms of blind bores 29 and 30 there is a solid section 31. Toward the end of the upper part on the outside there is an annular groove 31 for receiving a pipe clip 21 (FIG. 1).

A square cross section metal tube piece 23, to the exact shape of the bore, is inserted along the entire length of the lower blind bore 29, so that in the event of collision, only the upper part 28 of the adapter will bend. This is to prevent the entire traffic sign from being too pliable, which could cause undersirable swaying in, for example, strong winds. The integral reinforcing ribs 25, running in the direction of the generated surfaces of the upper part, have the same function. The square shape of the tube part *3a* inserted into blind bore 29 prevents the sign from turning on condition that the upper tube part *3b* is also fastened as securely as possible into adapter 5 by means of clip 21, so that it cannot turn. The upper tube part *3b* (FIG. 2) may be a 1" hollow tube, for example.

Figure 10:
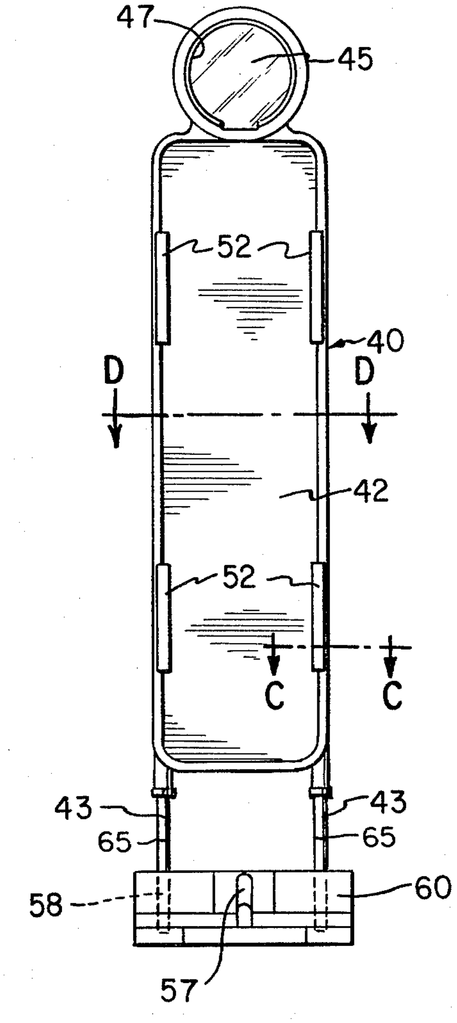
FIG. 10 is a front elevational view of a traffic sign according to the invention with a sign, a hazard warning light, two connecting tubes and a foot.
Figure 14:
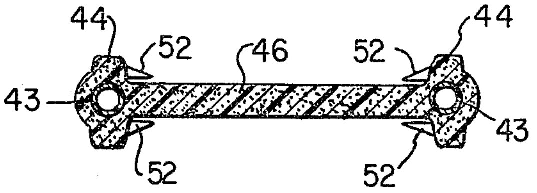
FIG. 14 is a sectional view taken along line D—D of FIG. 10.

As FIG. 10 shows, the traffic sign 40 basically consists of a foot 60 molded from a mixture of ground quartz and polyurethane and a flat, essentially rectangular lightweight sign 42. In the figure presented, the sign 42 is made of a shaped part consisting of polyurethane foam. Sign 42 and foot 60 are connected by means of two tubes 43 which are molded into the edge reinforcement 44. On top, there is an integral molded head section with a hazard warning light 45.

the sign plate 46 is flat and even on both sides (see FIG. 14). The reinforcement 44 along the edges of the sign projects on both sides in both directions. A variation to the traffic sign 41 presented in FIG. 11 is of analogous design to the traffic sign according to FIG. 10, with the difference that the hazard warning light 45' is designed so that it can be removed.

Figure 12:
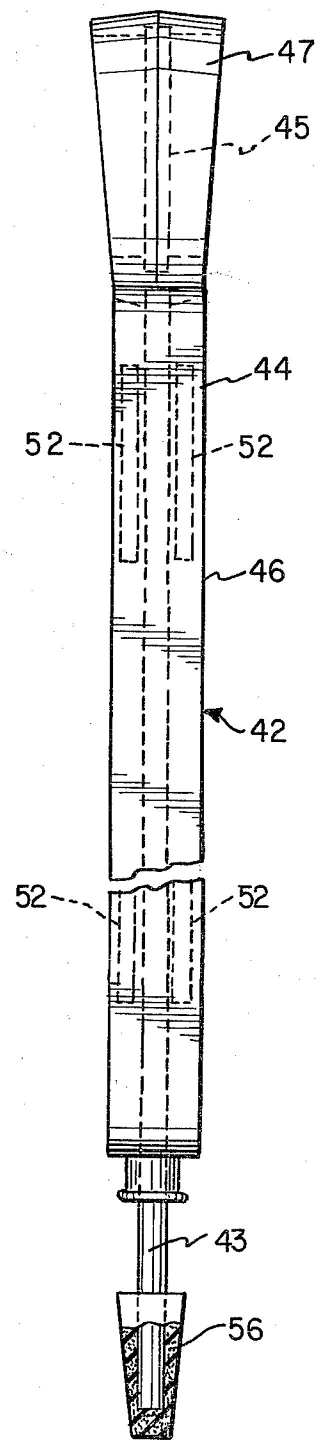
FIG. 12 is a longitudinal sectional view of traffic sign according to FIG. 10.
Figure 13:
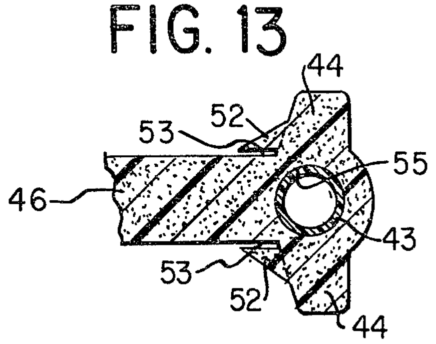
FIG. 13 is a sectional view taken along line C—C of FIG. 10.

The sign 42 features a molded on head section 47 (FIG. 12). Viewed from either side of the sign the head section 47 or 47' extends slightly outward or laterally. Inside the head section 45, there is a chamber which corresponds exactly to the shape of the hazard warning light. The hazard warning light 45 is completely embedded into the head section 47 and/or 47' with the exception of the protective glass, which is itself recessed relative to the contour of the head section 47 or 47'.

Figure 11:
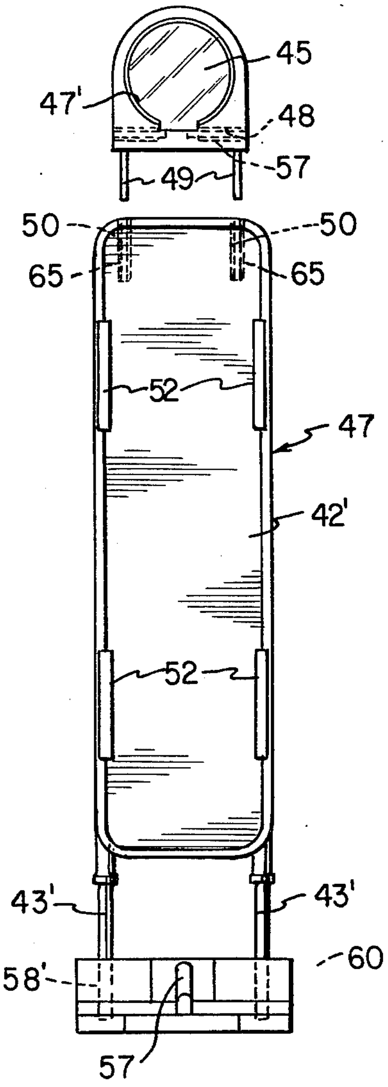
FIG. 11 is a front elevational view of further embodiment of the traffic sign according to the invention with a removable hazard warning light.

In the case of the removable head section 47' according to FIG. 11, there are lateral bore holes 48 provided to accommodate the tubes 51 carrying the electric cables. To fulfill all possibilities of application, electric line and battery supply connections are provided. In the lower section of the removable head section 47', there are two bolts 49 for insertion into bore holes 50 which are provided in the upper section of the sign 42'. These bore holes are reinforced with relevant tubes 65.

The hzard warning light 45 is visible from both directions. As FIGS. 10, 11, 12 and 13 show, at the sides of the edge reinforcement 44 both in the upper and lower sections of the sign 42, there are integral strips 52 molded on in such a way as to form a narrow groove 53 between the sign plate 46 and each strip 52. These grooves 53 are meant to accommodate a flexible sheet displaying the warning symbol, which can be, for example, red and white stripes. The width of the stripes are so proportioned that the sheet of aluminum of PVC foil cannot slip out of the grooves 53, if the sign 42 is distorted.

As FIGS. 12 and 14 show, in about the center of the perpendicular sides of the edge reinforcement 44 there are bore holes 55 to receive the reinforcing tubes 43. These bore holes run parallel to the longitudinal axis of the traffic sign 40 or 41. In the example depicted, the reinforcing tubes 43 consist of a pliant, plastic material.

At the end of the tube there is a cone 56 made of rubber which increases the flexibility of the seat in the foot 60 and permits the tubes 43 to slip out of the foot 60 by deformation in the event of a collision. In the traffic sign depicted in FIGS. 10 and 11, the reinforcing tubes 43 extend below the bottom edge of the sign and have the simultaneous function of connecting tubes between the sign, and the foot 60 which is provided on its upper part with corresponding blind bores 58.

If metal tubes are used instead of pliable plastic tubes. the former will be provided with breaking points 65 along the un-covered parts of the tubes extending below the sign. In the example depicted in FIGS. 10 and 11, the foot 60 fitted on each side with handles 57, is made of a mixture of ground quartz and polyurethane. The quartz to polurethane ratio is 1.00:0.15. The components of the mixture are mass colored with a signal dye.

I claim:

1. A traffic sign for roadways, comprising (a) a weighted base;

(b) a substantially rectangular, one-piece, flat sign portion comprised of a molded pliable polymer of relative low specific gravity and of relative high strength;

(c) vertical tube means connecting said base to said sign portion;

(d) said vertical tube means including (1) a cylindrical flexible adapter;

(2) a first vertical tube extending from said weighted base to said adapter;

(3) a second vertical tube extending from said sign portion to said adapter;

(4) spaced coaxial blind bores in said adapter for receiving said first and second vertical tubes;

(5) an annular locking clip receiving groove in the outer surface of said adapter adjacent the top thereof;

(e) integral vertical reinforcing rib means extending adjacent to the longitudinal axis of said sign portion;

(f) a pair of spaced transverse integral reinforcing ribs extending laterally from the rear surface of said sign portion;

(g) coaxial bores in said spaced transverse ribs, said coaxial bores in the said longitudinal axis of said sign portion;

(h) said coaxial bores receiving said second vertical tube;

(i) a continuous integral molded edge reinforcement extending from both faces of said flat sign portion;

(j) a bore in each of the vertical portions of said edge reinforcement;

(k) elongated flexible reinforcing means extending in said vertical bores; and (l) a space in said flat sign portion for containing electrical connection means for said warning light.

2. A traffic sign as claimed in claim 1, further including.

(a) a hazard warning light in the upper portion of said sign portion, and embedded in said molded pliable polymer;

(b) a cover for said warning light; and (c) a continuous integral molded rim grooved on said upper portion of said sign portion for receiving and retaining said cover.

3. A traffic sign as claimed in claim 2, further including (a) a space for containing electrical connection means for said warning light in said flat sign portion.

4. The sign of claim 3, further characterized by (a) a continuous vertical bore in the longitudinal axis of said sign portion; and (b) said continuous vertical bore receiving the electrical connection means for said hazard warning light.

5. The sign of claim 2, further characterized by (a) an integral molded head section molded onto the top of said sign portion; and (b) said warning light embedded into said head section.

6. The sign of claim 2, further characterized by (a) sign receiving strips integrally molded onto said edge reinforcement;

(b) said sign receiving strips and said edge reinforcements defining a warning sign receiving groove on each face of said sign portion.

7. The sign of claim 2, further characterized by (a) a separate molded head section for mounting on the top of said flat sign portion;

(b) said warning light embedded into said head section; and (c) means for connecting said head section to said sign portion.

8. The sign of claim 1, further characterized by (a) at least one blind bore in the top of said weighted base;

(b) said first vertical tube extending into said blind bore; and (c) said weighted base is comprised of ground quartz and polyurethane.

9. The sign of claim 8, further characterized by (a) the ratio of quartz to polyurethane is 1.00:0.15.

10. The sign of claim 1, further characterized by (a) handles on said weighted base.

11. The sign of claim 1, further characterized by (a) said polymer being of a synthetic thermoplastic material.

12. A movable traffic sign for roadways, comprising (a) a weighted base adapted to rest on the roadway;

(b) a flat rectangular, one-piece sign means including at least one face portion;

(c) at least one vertical metal tube connecting said sign means to said base;

(d) said sign means is comprised of a flexible polymeric material of relative low specific gravity and of relative high strength;

(e) said sign means having integral longitudinal moldings formed along each side edge of said face portion of said sign means;

(f) said integral longitudinal moldings being spaced from and cooperating with the said face portion to define grooves;

(g) a sign sheet positioned against said face portion and having lateral edges extending into said grooves;

(h) an integral rim disposed continuously along the top and side edges of said sign means;

(i) breaking points along each of said vertical tubes connecting said sign portion to said base; and (j) said flat head means, said sign means and said cooperating plug means includes a space for containing electrical connection means.

13. A sign as claimed in claim 12, further including (a) a separate flat head means;

(b) a warning signal embedded in said flat head means;

(c) a protective covering for said warning signal; and (d) cooperating plug means for connecting said flat sign means and said separate head means.

* * * * *